US007416582B2

(12) United States Patent
Hakka et al.

(10) Patent No.: US 7,416,582 B2
(45) Date of Patent: Aug. 26, 2008

(54) METHOD AND APPARATUS FOR $NO_x$ AND HG REMOVAL (75) Inventors: Leo E. Hakka, Dollard des Ormeaux (CA); Michel A. Ouimet, Montreal (CA); John Nicolas Sarlis, Laval (CA); Colin Francis Ryan, Montreal (CA)

(73) Assignee: Cansolv Technologies Inc., Montreal (CA)

( * ) Notice: Subject to any disclaimer, the term of this patent is extended or adjusted under 35 U.S.C. 154(b) by 327 days.

(21) Appl. No.: 11/207,820

(22) Filed: Aug. 22, 2005

(65) Prior Publication Data
US 2006/0021506 A1 Feb. 2, 2006

Related U.S. Application Data (63) Continuation-in-part of application No. 10/902,134, filed on Jul. 30, 2004, now abandoned.

(51) Int. Cl.
*B01D 53/56* (2006.01)
*B01D 53/96* (2006.01)

(52) U.S. Cl. ........................... 95/232; 423/235
(58) Field of Classification Search ............... 95/162, 95/168, 187, 211, 230, 232; 423/210, 235
See application file for complete search history.

(56) References Cited

U.S. PATENT DOCUMENTS

| 4,087,372 A | * | 5/1978 | Saitoh et al. ............... 252/184 |
| 4,091,074 A | * | 5/1978 | Gorai et al. ................. 423/235 |
| 4,126,529 A | | 11/1978 | DeBerry |
| 4,158,044 A | * | 6/1979 | Takabatake et al. ......... 423/235 |
| 4,372,932 A | * | 2/1983 | Hass .......................... 423/351 |
| 4,386,058 A | * | 5/1983 | Hass .......................... 423/235 |
| 4,418,044 A | | 11/1983 | Kulik |
| 4,612,175 A | * | 9/1986 | Harkness et al. ............ 423/235 |
| 4,778,664 A | * | 10/1988 | Grinstead ................... 423/235 |
| 4,804,522 A | * | 2/1989 | Hass .......................... 423/235 |
| 4,879,102 A | * | 11/1989 | Hoppe et al. ................ 423/235 |
| 5,200,160 A | * | 4/1993 | Benson et al. .............. 423/235 |
| 5,320,816 A | * | 6/1994 | Tsai et al. ................... 423/235 |
| 5,433,934 A | * | 7/1995 | Chang et al. ................ 423/235 |

(Continued)

FOREIGN PATENT DOCUMENTS

WO    WO 03/013701    2/2003

OTHER PUBLICATIONS

Richard J. Walker and Henry W. Pennline "Absorption, Electrodialysis, and Additional Regeneration in Two Flue Gas so$_2$/ NO$_x$" paper No. 58d presentation at the Symposium on Membrane Process for Pollution Control at the 1987 Annual Meeting of the American al Institute of Chemical Engineers, New York, New York, Nov. 15-20, 1987.

(Continued)

*Primary Examiner*—Frank M Lawrence
(74) *Attorney, Agent, or Firm*—Philip C. Mendes da Costa; Bereskin & Parr (57) ABSTRACT

A cyclic process for the removal of $NO_x$ from a $NO_x$ containing feed gas, and optionally removal mercury vapour and/or sulfur dioxide is provided. A process is also provided by which an iron chelate absorbent may be thermally regenerated.

36 Claims, 3 Drawing Sheets

U.S. PATENT DOCUMENTS

| | | | | |
|---|---|---|---|---|
| 5,489,421 | A | * | 2/1996 | Van Velzen et al. ......... 423/387 |
| 5,683,666 | A | | 11/1997 | Berisko |
| 5,785,841 | A | * | 7/1998 | Tseng ........................ 205/763 |
| 5,891,408 | A | * | 4/1999 | Buisman et al. ............. 423/235 |
| 6,328,939 | B1 | | 12/2001 | Amrhein |
| 2003/0026744 | A1 | * | 2/2003 | Hakka et al. ................ 422/177 |

OTHER PUBLICATIONS

Elzo Sada, Hidehiro Kumazawa, and, Hiroshi Hikosaka "A Kinetic Study of Absorption of NO into Aqueous Solutions of $Na_2So_3$ with added $Fe_{II}$-edta Chelate" Ind. Eng. Chem. Fundam, 1986, vol. 25, pp. 386-390.

Kevin D. Welch, T. Zane Davis, and Steven D. Aust "Iron Autoxidation and Free Radical Generation Effects of Buffers, Ligands, and Chelators" Archives of Biochemistry and Biophysics, vol. 397, No. 2, Jan. 15, 2002, pp. 360-369.

J. Karhu, S.L. Alvarez Cresop, L. Jarju and A. Ivaska "Recovery of the Chelating Agent Edta and Dtpa from Pulping Process Solutions" Laboratory of Analytical Chemistry Abo Akademi University Biskopsgatan 8, FIN-20500 Abo, Finland. Preprints of the 1998 International Bleaching Conference, Helsinki, Jun. 1-5, pp. 673-678.

Daniel C. Harris and Philip Aisen "Facilittation of Fe (II) autoxidation by Fe (III) Complexing agents" Biochimica et Biophysica Acta, 329 (1973) pp. 156-158.

Tomasz T. Suchecki and Hidehiro Kumazawa "Absorprtion of Nitrogen Oxide of Low Concentrations into Aqueous Solutions of $Na_2So_3$ and Fe(II) edta with added $N_2H_4$" Archives of Environmental Protections, vol. 24, No. 4, pp. 35-57 (1998).

K. Smith, L. Benson, S. Tseng, P. Bergman and M. Babu "Enhanced $NO_x$ removal in Wet Scrubbers Using Metal Chelates Testing at Miami Fort Pilot Plant", Proceedings of the 1992 Clean Coal Conference.

Susan S. Tsai, Stephen A. Bedell, Larry H. Kirby and Donna J. Zabcik "Field Evaluation of Nitric Oxide abatement in Wet Flue Gas Using Ferrous Chelagets" Prepared for Presentation at the 1998 AICHE summer meeting Denver, Colorado, Innovative Techniques for Flue Gas Cleanup, paper #81B.

* cited by examiner

METHOD AND APPARATUS FOR NO$_X$ AND HG REMOVAL

This application is a continuation in part of application Ser. No. 10/902,134 filed on Jul. 30, 2004 which is abandoned.

FIELD OF THE INVENTION

This invention relates to a process for the recovery of NO$_x$, and optionally mercury, from a gaseous stream. In another aspect, this invention provides a method of regenerating an iron chelate absorbent.

BACKGROUND OF THE INVENTION

SO$_2$ removal is most often conducted by one of limestone slurry scrubbing, limestone addition to fluidized boilers, lime spray driers, caustic wet scrubbing or, more recently, by regenerable amine solution scrubbing. Each of these processes has properties, which tend to make them suitable for some particular applications but not others. Each specific situation is evaluated for the optimum choice of technology.

NO$_x$ (mainly nitric oxide NO, with low ppmv's of NO$_2$) removal in many cases is done by Selective Catalytic Reduction (SCR) in which the NO is reduced to N$_2$ by ammonia over a heterogeneous catalyst at elevated temperature. Deficiencies of this process are high cost, large equipment and the toxic and flammable nature of the ammonia reductant. Other means of NO$_x$ reduction which have been reported include processes which oxidize the NO to more water soluble NO$_2$ or N$_2$O$_5$, which is then captured by an alkaline wet scrub. Oxidants such as chlorine dioxide, sodium hypochlorite, permanganate, hydrogen peroxide, ozone and corona discharge have been used. The cost of the reagents is generally prohibitive except for the conversion of small concentrations of NO$_x$. The nitrates and nitrites, which are then captured in the subsequent wet scrubbing step present unacceptably high concentrations in the process effluent water in some cases.

U.S. Pat. No. 6,872,374 (Hakka et al) discloses a process that utilizes aqueous ferrous ethylenediamine tetraacetic acid chelates as agents for NO capture. The FeEDTA nitrosyl complex formed must be regenerated back to Fe$^{2+}$ EDTA in order to reuse the complex reagent in absorbing further NO. The regeneration comprises a denitrosation step that occurs via a chemical reaction. Denitrosation can be accomplished by reacting the iron nitrosyl complex with sulfite and/or bisulfite, which is often present as a result of absorption of SO$_2$ from the feed gas. This regeneration method produces so-called N,S products (e.g. iminodisulfonate and sulfamic acid salts). These must be removed from the solution to prevent accumulation.

Regeneration of an iron chelate absorbent by heating up the NO-containing solvent to drive off the NO has been reported (U.S. Pat. No. 4,158,044) but the pH of the solvent is between 2 and 3. However, it is known (J. Karhu, S. L. Alvarez Crespo, L. Harju and A. Ivaska, Preprints of the 1998 International Bleaching Conference, Helsinki, June 1-5, pp. 673-678) that the Fe$^{2+}$ EDTA complex is unstable at these pH values, separating into insoluble EDTA in its acid form and iron ions, which bind only weakly to NO (U.S. Pat. No. 4,418,044). Other authors (R. J. Walker and H. W. Pennline, Paper No. 58d at the Symposium on Membrane Processes for Pollution Control, 1987 Annul Meeting of the AIChE, New York) report that they did not observe NO$_x$ in the off-gas from a thermal stripper.

A disadvantage of the use of iron chelates for NO capture is the high rate of oxidation of the ferrous chelate to the ferric form, which does not absorb NO. The Fe$^{2+}$ ion oxidizes much faster when it is chelated to EDTA (K. D. Welch, T. Z. Davis and S. D. Aust; Archives of Biochemistry and Biophysics, 397. 2, pp. 360-369 (2002); D. C. Harris and P. Aisen, Biochimica et Biophysica Acta. 329 (1973) 156-158). The reduction of Fe$^{3+}$ EDTA can be accomplished by the sulfite/bisulfite often present from the SO$_2$ component of the feed gas, but this produces large quantities of dithionate salts, which must be removed from the solution to prevent accumulation. The use of other chemical reducing agents such as hydrazine (Archives of Environmental Protection, 24, 4, (1998) pp. 35-37; U.S. Pat. No. 5,200,160), ascorbic acid or dithionite (K. Smith, L. Benson, S. Tseng, M. Babu and P Bergman, Proceedings of the 1992 Clean Coal Conference) is also possible but the cost of the reagent makes the process uneconomical. Biological reduction can also be used (U.S. Pat. No. 5,891,408). Reduction by electrolysis has also been described (U.S. Pat. No. 5,320,816, U.S. Pat. No. 5,433,934 and U.S. Pat. No. 4,126,529), but the high duty required by the rapid oxidation of Fe$^{2+}$ EDTA to Fe$^{3+}$ EDTA again makes this alternative less desirable.

Flue gas produced by the firing of coal is a major source of mercury emissions into the atmosphere. Mercury is extremely toxic, affecting the nervous system. Since it tends to bioaccumulate into the food chain, even small concentrations can eventually cause health effects in humans and fauna. The concentration of mercury in flue gases is generally in the range of 10 micrograms per cubic meter, so effective capture can be difficult. Compounding this difficulty is the fact that the mercury is present both as particulates of ionic mercury (II) compounds and as a vapor of the elemental form. The ionic compounds can be captured by particulate collection devices such as baghouses, electrostatic precipitators (ESP's) or wet scrubbers but the vapor passes through freely. Processes for mercury vapor capture use one of two stratagems: either try to capture the mercury vapor (Hg°) as such by means of adsorbents such as activated carbon or by oxidizing the element to ionic mercury in the gas phase which can then be captured by means such as wet scrubbing. Suitable oxidants such as chlorine dioxide and ozone may be used. Deficiencies of the preceding mercury removal methods include high cost and insufficiently low removal efficiency.

SUMMARY OF THE INVENTION

In accordance with one aspect of the present invention, it has also been discovered that additives comprising a free radical scavenger, such as sodium thiosulfate in combination with one or more amines, is effective in stabilizing iron EDTA against oxidative degradation and in reducing the rate of Fe$^{2+}$ oxidation. Further such a combination does not result in the production of salts that form if sulfite is present, such as sodium dithionate or sodium sulfate. Such salts, if they form, must be removed from the absorbent to prevent buildup of these salts as the absorbent is recycled.

The free radical scavenger and the amine may be separate additive compounds. Alternately, an additive compound may have portions that provide the amine function and the free radical scavenger function. For example, the compound may be benzene and/or naphthalene derivatives wherein at least one, and preferably both of the functional groups at the 1,2- and 1,8-positions is an amino function and the other may be either an amine or a phenol, or a phenoxide, if the solution pH is alkaline enough to cause ionization of the phenol, or mixtures thereof. The benzene and/or naphthalene may also having suitable solubilizing groups on the aromatic ring such as sulfonic acid, nitro, carboxylic acid or hydroxyethyl functionalities. Preferably, the additive compound is 4-amino-5-hydroxy-2,7-naphthalenedisulfonic acid ($pK_a$=3.4) and/or sulfonated 1,8-diaminonaphthalene. It has been determined that these compounds are an especially effective class of inhibitors which both reduce the rate of $Fe^{2+}$ oxidation and EDTA degradation.

Without being restricted by theory, it is hypothesized that the 1,2- or 1,8-functionality allows the formation of coordination bonds by the amine and/or the phenol or phenoxide to the iron atom. Aromatic amines or phenols act as antioxidants or free radical scavengers. Through being bonded to the iron atom, they are proximal to the $Fe^{2+}$ atom, which generates free radicals during oxidation (i.e., through reaction with $O_2$.). The EDTA degradation effectiveness of these inhibitors is the result of having the ability to act as an antioxidant and being fixed at the location where the free radicals, which are assumed to be responsible for the degradation, are formed. It has been determined that when at least one of the 1,2- or 1,8-functionalities is an amine, then the tendency of the $Fe^{2+}$ atom to oxidize is reduced. These aromatic additives may be used at a ratio of 0.05-3.0 moles per atom of Fe, more preferably at 0.1-2.5 moles per Fe, or most preferably at 0.5-2.0 per Fe.

If the additive comprises an amine and a separate free radical scavenger, then the free radical scavenger may be present in an amount of from 0.05 to 2, preferably 0.1 to 1 and more preferably 0.1 to 0.5 wt. %, based on the weight of the absorbent. Preferably, the free radical scavenger is a thiosulfate, and, more preferably sodium or potassium thiosulfate. Without being limited by theory, it is believed that if the iron in the iron chelate is oxidized, it results in the production of free radicals (e.g., peroxide radicals HOO•), which will degrade the chelate. If some iron is oxidized, then the thiosulfate acts as a free radical inhibitor to capture the free radicals and inhibit the degradation of the chelate and prevent a free radical chain reaction.

The absorbent is an iron amine polycarboxylic acid chelate, and, preferably, an iron amine polycarboxylic acid chelate dissolved in water. Preferably, the iron chelate is an iron N-(2-hydroxyethyl)ethylenediaminetriacetate sodium salt and, more preferably, iron ethylenediaminetetraacetate disodium salt. Preferably, the concentration of the iron chelate is 0.05 to 0.5 M, more preferably 0.1 to 0.4 M and, most preferably 0.1 to 0.3 M.

Without being limited by theory, it is believed that the amine reduces the rate of oxidation of the $Fe^{2+}$ EDTA absorbent. Amines effective in reducing oxidation may be primary, secondary or tertiary with $pK_a$'s in the range 2.5-10, preferably 3.9-10 and, more preferably 3.9-9.5. To prevent loss of the amine with the treated gas, the preferred amines preferably have a vapor pressure less than 1 mm Hg at 50° C. over the absorbent. Preferred amines include 4-(2-hydroxyethyl)-1-piperazineethanesulfonic acid ($pK_a$=7.5), morpholinoethanesulfonic acid ($pK_a$=6.1), N-(2-hydroxyethyl)ethylenediamine ($pK_a1$=9.5, $pK_a2$=6.5), piperazine $pK_a$ 1=9.8, $pK_a2$=5.6), N-(2-hydroxyethyl)piperazine ($pK_a$ 1=9.0, $pK_a$ 2=4.5), benzimidazole ($pK_a$5.5), pyrazole ($pK_a$=2.5) and N,N'-bis(2-hydroxyethyl)piperazine ($pK_a1$=7.8, $pK_a2$=3.9) and mixtures thereof.

The pH of the absorbent during the absorption step is preferably 4.0 to 7.0, more preferably 4.5 to 6.0 and, most preferably, from 5.5 to 6.0. The pH of the absorbent when it is introduced to the gas stream that is to be treated is preferably in this range. Further, the pH of the absorbent is preferably maintained in this range, such as by the addition of an acid or a caustic as may be required. The pH change to the absorbent during the absorption process is typically relatively small and therefore, no adjustment of the pH may be required during the absorption process. Accordingly, 4-(hydroxyethyl)piperazineethanesulfonic acid, sulfonated 1,8-diaminonaphthalene and 4-amino-5-hydroxy-2,7-naphthalenedisulfonic acid will be in salt form during the absorption process. Preferably, it is present as a sodium or potassium salt rather than an amine salt. The sulfonic acid is a strong acid and will ionize at a pH greater than about −3 and needs to be neutralized (e.g. with NaOH) for the process solvent to attain or remain at the desired operating pH. The N-(2-hydroxyethyl)ethylenediamine (HEED), N-(2-hydroxyethyl)piperazine (HEP), N,N'-bis(2-hydroxyethyl)piperazine (DIHEP) and piperazine are diamines and the stronger amine function (i.e., the amine with a pKa of, e.g., 9.0 or 7.8) will be in protonated form associated with the anion of a strong acid such as sulfate or sulfite at the operating pH of the process.

The mole ratio of amine to iron is preferably in the range 3:1 to 1:1 and, more preferably about 2:1.

Preferably, the absorbent also includes an oxygen scavenger. The oxygen scavenger acts as an $O_2$ scavenger to inhibit the oxidation of iron in the iron chelate. The oxygen scavenger may be present in an amount of from 0.05 to 5, preferably 0.1 to 3 and, more preferably 0.5-1 wt. %, based on the weight of the absorbent. Preferably, the $O_2$ scavenger is derived from $SO_2$ that is absorbed from the gas being treated, i.e., a sulfite and/or a bisulfite and, most preferably sodium or potassium sulfite and/or bisulfite. The ratio of sulfite to bisulfite is typically dependent upon the pH of the absorbent. At a pH of 5.5, most of will be in the form of bisulfite (~95%) rather than sulfite.

In accordance with another aspect of the present invention, an aqueous iron chelate solution is used to capture $NO_x$ and mercury vapor ($Hg^0$). Without being bound by theory, it is believed that the mechanism of the $Hg^0$ removal is by means of oxidation of the $Hg^0$ to $Hg^{2+}$ by one or more oxidants followed by adsorption of the $Hg^{2+}$ in the absorbent. Once in the ionic form, the mercury is no longer volatile. Removal of the mercury from the absorbent can be performed by filtering at least a slipstream of the absorbent through an ion exchange resin with a high affinity for $Hg^{2+}$, such as the Keyle:X® resin from Solmetex Corporation. The mercury may also be precipitated and separated by the addition of a chemical such as trimercapto-s-triazine trisodium salt (TMT™ 15 from Degussa) which forms a highly insoluble complex with mercury. The mercury is preferably removed from the absorbent prior to the absorbent being regenerated.

In accordance with another aspect of the present invention, the feed gas is first treated to remove $NO_x$ therefrom, (e.g., exposing the feed gas to the iron EDTA absorbent to absorb $NO_x$) and subsequently treated to remove mercury therefrom (i.e. by exposing the mercury in the feed gas to one or more oxidizing agents to oxidize the mercury and subsequently absorbing the oxidized mercury in an absorbent which is preferably the solution containing the oxidizing agent).

The oxidizing agent may be a ferric salt in acidic solution, potassium permanganate solution, sodium hypochlorite solution or mixtures thereof. The oxidizing agent may also be $Fe^{3+}$ that is present in the $Fe^{3+}$ EDTA. Preferably, the oxidizing agent comprises $Fe^{3+}$ and at least one other oxidizing agent, which is preferably a ferric salt in acidic solution, potassium permanganate solution, sodium hypochlorite solution or mixtures thereof.

One embodiment for the removal of $Hg^0$ is to control the ratio $Fe^{2+}/Fe^{3+}$ in the absorbent to a value that enables both $NO_x$ and $Hg^0$ to be captured with one scrubbing step. This may be accomplished by counterbalancing the oxidation of $Fe^{2+}$ in the absorbent by $O_2$ in the feed gas and/or by treating the absorbent being regenerated with a suitable reducing method such as electrolysis or the addition of chemical reductants such as sodium hydrosulfite (sodium dithionite) or hydrazine to increase the amount of $Fe^{2+}$ in the absorbent that contacts the feed gas. Assuming that $Hg^{2+}$ is the ionic form of mercury in solution, then the oxidation of mercury may be represented by Equation 1:

$$2Fe^{3+} EDTA + Hg^0 \Rightarrow 2 Fe^{2+} EDTA + Hg^{2+} \qquad (1)$$

and the absorption of NO by $Fe^{2+}$ EDTA may be represented as in Equation 2:

$$Fe^{2+} EDTA + NO \Rightarrow Fe^{2+} EDTA \cdot NO \qquad (2)$$

If such a process is used to capture both $NO_x$ and $Hg^0$, then the proportion of iron in the iron chelate in the $Fe^{2+}$ state prior to the absorbent contacting the feed gas is preferably 20 to 90% of the total iron, more preferably 25 to 75% and, most preferably 30 to 65%. The remainder of the iron is preferably in the $Fe^{3+}$ state.

A second embodiment for recovering mercury from a feed gas is to have two separate scrubbing steps, a first with a high percentage of $Fe^{2+}$ for $NO_x$ removal (which may be in any of those ranges set out previously) and a second step with an oxidizing agent such as a ferric salt in acidic solution, potassium permanganate solution or sodium hypochlorite solution for $Hg^0$ removal. A further advantage of having a second step utilizing an oxidizing medium is that any NO not captured in the first step will be oxidized to $NO_2$ and further to nitrate ($NO_3^-$) or $N_2O_5$, which will dissolve in alkaline media (e.g., the oxidizing agent) and result in a higher degree of and, preferably, essentially complete removal of $NO_x$.

A third embodiment for recovering mercury from a feed gas is to pretreat the feed gas in a prescrubber with an aqueous oxidant. In the prescrubber, the $Hg^0$ is oxidized and absorbed in the water. Thus the feed gas that is contacted with the iron chelate absorbent has a reduced mercury level. It will be appreciated that one or more of these methods may be used sequentially to treat a feed gas.

Many gases that may be treated for $NO_x$ and mercury pollutants by this process may also contain $SO_x$ ($SO_2$ and $SO_3$), particulates, and other known contaminants. These may be removed by methods known to those in the art, often preferably prior to the process(es) of the present invention. Accordingly, the feed gas may contain 0-100 ppmv $SO_2$, more preferably 1-50 ppmv and most preferably 5-20 ppmv $SO_2$ if it is desired to form in situ the sulfite/bisulfite for oxygen scavenging or if it is desired to remove the $SO_2$ remaining in the feed gas after a prior $SO_x$ removal process.

In accordance with another aspect of the present invention, the $NO_x$ rich iron chelate absorbent is preferably thermally regenerated to remove the NO from the complex. It is understood that the nitric oxide (NO) that is absorbed combines with the iron chelate to from an iron chelate nitrosyl complex. Without being limited by theory, the nitrosyl group may be removed from the iron chelate absorbent, forming a $NO_x$ lean absorbent, at elevated temperature using a stripping gas to transport out the evolved NO, e.g. by steam stripping. Preferably, the pH of the absorbent at the commencement of the steam stripping process is from 4 to 7, more preferably from 5 to 6 and, most preferably 5.5 to 6.0. It has been determined that by operating the process at such pH, the formation of N,S products is minimized.

In the thermally treated $NO_x$ lean absorbent, the iron is a mixture of ferrous and ferric oxidation states. Accordingly the regeneration process preferably includes a reduction step to convert sufficient ferric iron to its ferrous state to provide the desired $Fe^{2+}/Fe^{3+}$ ratio. $Fe^{3+}$ EDTA may be reduced to $Fe^{2+}$ EDTA by electrolysis or chemical reduction.

Chemical reducing agents are known to those in the art. The chemical reducing agent is preferably one or more of sodium dithionite (sodium hydrosulfite), calcium dithionite and hydrazine. Sulfite will also slowly reduce $Fe^{3+}$ under the operating conditions of the present process.

Electrolytic reduction may be used, the reactions in the presence of bisulfite in the anolyte being:

Cathode reaction: $2 Fe^{3+} + 2e^- \Rightarrow 2Fe^{2+}$

Anode reaction: $HSO_3^- + OH^- \Rightarrow H_2SO_4 + 2 e^-$

If the cell compartments are divided by an anion selective membrane, then bisulfite and other anions will transport from the cathode compartment as the current carrier and sulfuric acid will build up in the anolyte. Its concentration can be controlled to the desired value by blowdown of anolyte to waste water treatment and the addition of fresh water.

Preferably, the membrane is a cation selective membrane. If it is desired to utilize a cation selective membrane between the anode and cathode compartments, to prevent transport of the FeEDTA chelate to the anolyte compartment, which exists in the solution as the dianion disodium salt, then the anode reaction will produce oxygen and protons will transport through the membrane into the catholyte as the current carrier:

Anode reaction: $H_2O \Rightarrow O_2 + 2H^+ + 2e^-$

Since the FeEDTA complex is too expensive to be used on a once-through basis, the instant process preferably provides for regeneration of the NO laden absorbent (the NO rich solvent or the spent solvent) in a regeneration column at elevated temperature and optionally reduced pressure. A reboiler is preferably used to generate stripping steam, which flows upwardly through the stripping column to transport overhead the released NO. A condenser in the overhead stream condenses the steam and the condensed water is returned to the stripping column as reflux. The NO stream is disposed of in a suitable manner, e.g. by conversion to harmless nitrogen in the reducing flame part of a boiler burner.

The absorption process also typically results in the production of salts from the reaction of the sulfite and bisulfite (if used) and thiosulfate. Accordingly, the regeneration process also preferably includes treating at least a portion of the thermally treated absorbent to remove these anions. These anions may be removed by ion exchange, electrodialysis and/or by precipitation. The precipitation could be by chemical addition or cooling.

In accordance with one embodiment of the instant invention, there is provided a cyclic process for the removal of $NO_x$ from a $NO_x$ containing feed gas stream using an absorbent and for the regeneration of the absorbent, which comprises:
(a) contacting the feed gas stream with the absorbent to form a $NO_x$ rich absorbent, the absorbent comprising an iron amine polycarboxylic acid chelate, and an additive having free radical scavenger functionality and amine functionality;
(b) treating the $NO_x$ rich absorbent to remove $NO_x$ and to form a regenerated absorbent; and,
(c) recycling the regenerated absorbent to the contacting step.

In one embodiment, the additive comprises a free radical scavenger and an amine having a pKa in the range 2.5-10.

In an alternate embodiment, the additive comprises benzene and/or naphthalene derivatives wherein one of the functional groups at the 1,2-position of the benzene and the 1,8- positions of the naphthalene comprises an amine. Preferably, another of the functional groups at the 1,2-position of the benzene and the 1,8-positions of the naphthalene comprises an amine, a phenol or a phenoxide, if the solution pH is alkaline enough to cause ionization of the phenol. Alternately, or in addition, the benzene and/or naphthalene derivatives have a solubilizing group on the aromatic ring structure. Preferably the solubilizing group comprises sulfonic acid, a nitro substituent, carboxylic acid or a hydroxyethyl substituent.

In accordance with another embodiment of the instant invention, there is provided a process for the regeneration of a spent iron amine polycarboxylic acid chelate absorbent that has absorbed NO comprising exposing the spent iron chelate absorbent which is at a pH of 4-7 to steam to form an NO lean absorbent.

In accordance with another embodiment of the instant invention, there is provided a cyclic process for the removal of $NO_x$ and $Hg_0$ from a $NO_x$ and $Hg_0$ containing feed gas stream using an iron amine polycarboxylic acid chelate absorbent and for the regeneration of the absorbent, which comprises:
(a) contacting the feed gas stream with the absorbent to form a $NO_x$ reduced gas stream and a spent $NO_x$ absorbent;
(b) contacting the $NO_x$ reduced gas stream in a second contacting step with an oxidizing agent to convert $Hg^0$ to an ionic form of mercury and absorbing the ionic mercury in the oxidizing agent;
(c) recovering the spent $NO_x$ absorbent;
(d) treating the spent $NO_x$ absorbent to remove $NO_x$ and forming a regenerated absorbent; and,
(e) recycling the regenerated $NO_x$ absorbent to the contacting steps.

In accordance with another embodiment of the instant invention, there is provided a cyclic process for the removal of $NO_x$ and $Hg^0$ from a $NO_x$ and $Hg^0$ containing feed gas stream using an iron amine polycarboxylic acid chelate absorbent and for the regeneration of the absorbent, which comprises:
(a) contacting the feed gas stream with the absorbent to form a $NO_x$ and mercury reduced gas stream and a spent absorbent;
(b) recovering the spent absorbent;
(c) treating the spent absorbent to recover mercury prior to regenerating the absorbent;
(d) treating the spent absorbent to remove $NO_x$ and forming a regenerated absorbent; and,
(e) recycling the regenerated absorbent to the contacting step.

In accordance with another embodiment of the instant invention, there is provided a cyclic process for the removal of $NO_x$ from a $NO_x$ containing feed gas stream using an iron amine polycarboxylic acid chelate absorbent and for the regeneration of the absorbent, which comprises:
(a) contacting the feed gas stream with the absorbent to form a $NO_x$ rich absorbent;
(b) thermally treating the $NO_x$ rich absorbent to remove NO and to form a regenerated absorbent; and,
(c) recycling the regenerated absorbent to the contacting step.

In accordance with another embodiment of the instant invention, there is provided a cyclic process for the removal of $NO_x$ and $Hg^0$ from a $NO_x$ and $Hg^0$ containing feed gas stream using an iron amine polycarboxylic acid chelate absorbent and for the regeneration of the absorbent, which comprises:
(a) treating the feed gas stream to oxidize $Hg^0$ and obtain ionic mercury in a water prescrubber using an oxidizing agent;
(b) contacting the feed gas stream with the absorbent to form a $NO_x$ and mercury reduced gas stream and a spent absorbent;
(c) recovering the spent absorbent; and,
(d) regenerating and recycling the spent absorbent.

BRIEF DESCRIPTION OF THE DRAWINGS

These and other advantages of the instant invention will be more fully and completely understood in conjunction with the following description of the preferred embodiment wherein.

DETAILED DESCRIPTION OF THE INVENTION

Figure 1:
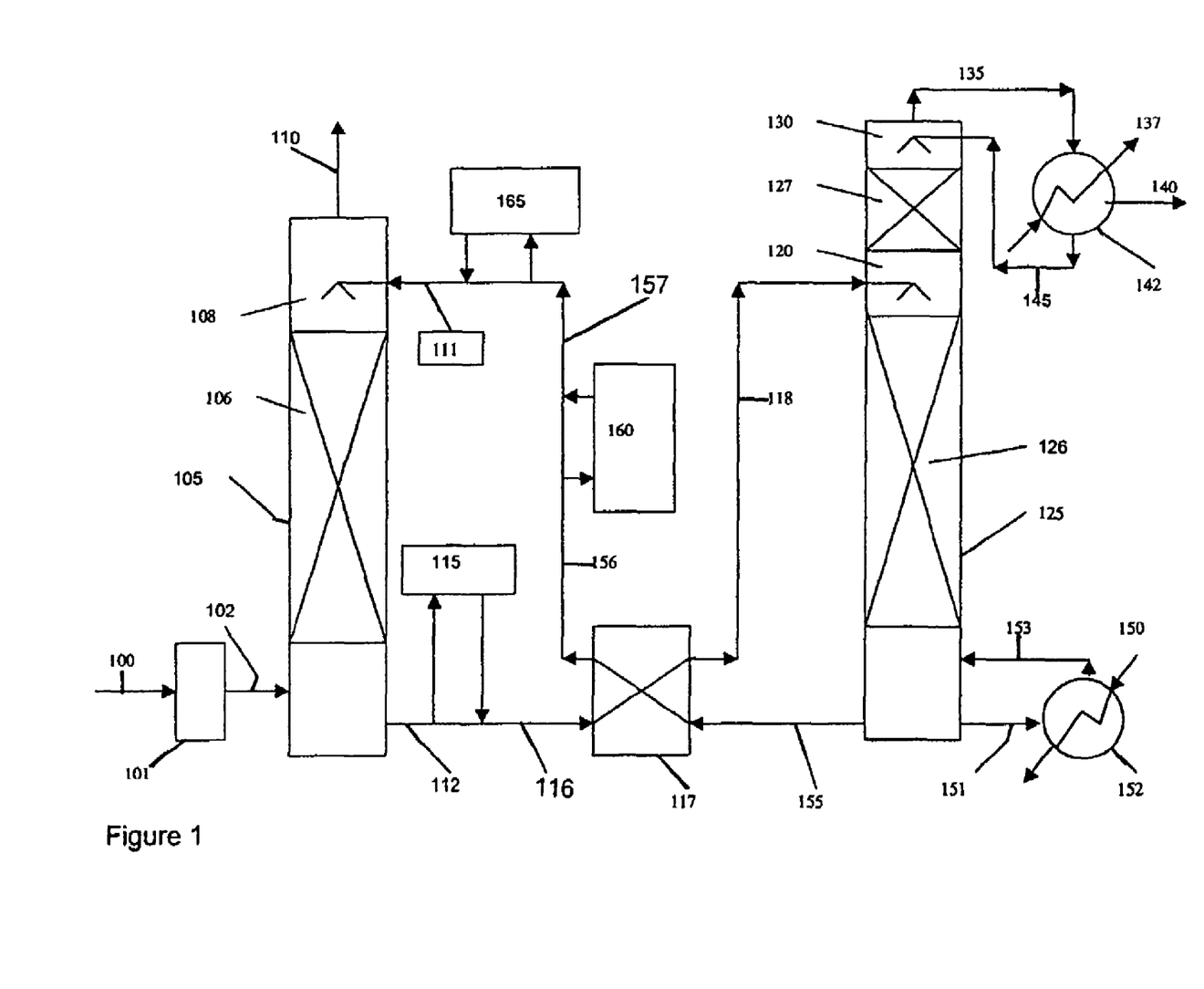
FIG. 1 is a schematic drawing of an apparatus according to this invention.

As shown in FIG. 1, feed gas stream 100 such as flue gas from the combustion of fuel such as coal, oil or petroleum coke, is treated in gas treating unit 101 by known processes such as electrostatic precipitators and wet scrubbers to reduce the content of particulate matter, $SO_2$ and acid mist to produce a treated gas stream 102. The treated gas stream 102 contains nitric oxides ($NO_x$) and may optionally contain one or both of elemental mercury vapor, and up to about 100 ppmv of $SO_2$. Treated gas stream 102 is preferably saturated or nearly saturated with water.

If the feed gas stream 100 contains less than about 100 ppmv of $SO_2$, it need not be treated to reduce the concentration of $SO_2$. Preferably, the concentration of $SO_3$ and particulate matter in treated gas stream 102 is also reduced to <25 ppm $SO_3$ and <25 $mg/m^3$ particulate matter.

Treated gas stream 102 is exposed to an absorbent to produce a spent absorbent and a $NO_x$ reduced feed gas stream. Treated gas stream 102 may be contacted with the absorbent by any means known in the art. As shown in FIG. 1, treated gas stream 102 preferably is contacted with the absorbent in an absorber column 105 and more preferably, is contacted with the absorbent countercurrently. Accordingly, treated gas stream 102 may be introduced at a lower portion of absorber column 105. The absorber contains packing 106 which effects countercurrent gas-liquid contact with lean regenerated absorbent 111. The regenerated absorbent is distributed over the packing by, e.g., distributor 108. Other gas-liquid contact devices may also be used, such as trayed towers, spray towers, in-duct spray scrubbers and the like. The treated gas reduced in $NO_x$ content leaves the absorber column as stream 110 to other processes or to the atmosphere. If feed gas stream 100 also contains mercury and/or $SO_2$, and the process is operated as optionally set out herein, then the treated gas stream 110 may also have a reduced level of these materials. The efficiency of gas-liquid contact and the liquid-to-gas ratio are specified to yield the desired degree of $NO_x$ removal.

In a preferred method, the absorbent comprises 0.3 M FeEDTA as the metal chelate complex, 0.3 M N-(2-hydroxyethyl)piperazine (HEP) as the amine and 0.2 Wt. % sodium thiosulfate as a free radical scavenger. In an alternate preferred method, the absorbent comprises 0.1 M FeEDTA as the metal chelate complex, 0.2 M 4-amino-5-hydroxy-2,7-naphthalenedisulfonic acid as the amine and 0.2 Wt. % sodium thiosulfate as a free radical scavenger. It will be appreciated that the absorbent and additive(s) may have any of the compositions set out herein. The pH of the absorbent is preferably adjusted prior to its passage through absorber column 105 to be at a desired value as set out herein (e.g. by being adjusted to be in any of the ranges set out here, e.g., the range 5.5 to 6.0) by adding a suitable base or acid (e.g., sodium hydroxide or sulfuric acid) as required.

If the process is used to remove mercury from treated gas stream 102, then at least a part of stream 112 is fed into a mercury removal process to reduce the concentration of mercury therein. Preferably, a slipstream of the $NO_x$ rich solvent is treated, e.g., with an ion exchange resin, to reduce the mercury content of the solvent. According to such an embodiment, rich solvent containing the $NO_x$ and mercury captured from the feed gas exits the bottom of the absorber column 105 as stream 112 and preferably, at least a part of stream 112 is fed into a mercury removal process unit 115 wherein a part and preferably most of the mercury ions (e.g., more than 60%) are removed by means such as an ion exchange resin (e.g., Keyle:X™ marketed by the SolmeteX Corporation), and adsorption or precipitation with suitable reagents such as TMT 15™ marketed by Degussa Corporation. The solvent reduced in mercury is then combined with the balance of stream 112 to form mercury lean stream 116.

The regenerated absorbent may be used to preheat the spent absorbent. Accordingly, stream 116, which may have a temperature of around 50° C., may be cross exchanged in heat exchanger 117 against the hot lean stream 155, which may have a temperature of about 100° C., flowing from the regeneration step back to the absorption step. This heat recovery operation reduces energy consumption. Heated spent absorbent stream 118 exits heat exchanger 117.

In accordance with one aspect of this invention, the absorbent is thermally regenerated, such as by means of a regeneration column 125 in which the absorbent is subjected to steam stripping. Accordingly, in the regeneration column 125, a reboiler 152 may be used to generate steam to strip NO from the solvent. The operating pressure of the regeneration column is often preferably above atmospheric and, more preferably, is about ⅓ bar gauge. However, operation at subatmospheric pressure may be desirable in some cases to take advantage of a low temperature source of heat for the reboiler 152. The overhead vapors may be cooled in a condenser 142 and the condensed water may be returned to the regeneration column 125 as reflux. The gas phase, which is essentially water saturated NO, flows from the regeneration column 125 and is disposed of in a suitable manner, often preferably by feeding it to a reducing zone of a burner in the boiler that produces the feed gas.

Referring in detail to FIG. 1, a countercurrent steam stripping process is shown. Warm NO-rich absorbent stream 118 enters the regeneration column 125 through, e.g., liquid distributor 120. Column 125 has packing 126 below the liquid distributor to provide gas-liquid contact. The liquid of stream 118 flows downwardly in the column. Steam generated in reboiler 152 flows into the regeneration column as stream 153. This steam provides the energy for dissociating the NO from the iron chelate as well as providing upward vapor traffic to sweep the evolved $NO_x$ upward in the column. The steam and $NO_x$ flow through the packing 127 of the optional reflux rectification section and into an overhead condenser 142. The condenser is shown as water cooled, with stream 137 being the cooling water return. The gas phase from the condenser or an associated separator drum (not shown) leaves as stream 140. Stream 140 comprises a major fraction of $NO_x$, with minor amounts of $SO_2$ and water of saturation determined by the operating temperature of condenser 142. The water phase flows out from the condenser as stream 145 and is returned to the regeneration column through liquid distributor 130 as reflux. Liquid accumulates in the bottom of column 125. Some of the liquid may be withdrawn by stream 151 and fed to reboiler 152 to produce additional steam, which is returned to column 125 as stream 153. Regenerated absorbent stream 155, which has a reduced $NO_x$ and mercury content, is also withdrawn from column 125 and may be cooled in heat exchanger 117 so as to form cooled regenerated absorbent stream 156.

All or part of the regenerated $NO_x$ lean absorbent may be treated for reducing the salt (e.g. sodium sulfate) content and for adjusting the $Fe^{2+}/Fe^{3+}$ ratio as may be required. Preferably, slip streams of the regenerated $NO_x$ lean absorbent are taken for reducing the salt (e.g. sodium sulfate) content and for adjusting the $Fe^{2+}/Fe^{3+}$ ratio as may be required.

In order to control the level of anions such as sulfate in the circulating absorbent, a portion of stream 156 preferably flows into anion removal unit 160, which may utilize processes such as ion exchange or electrodialysis, which are known in the art. The absorbent reduced in anions flows back to join the balance of stream 156, forming anion reduced stream 157.

The reduction of the $Fe^{3+}$ content of the absorbent is preferably performed on a slipstream of the lean absorbent downstream from reducing unit 165. Reducing unit 165 may employ methods such as electrolysis or the use of chemical reductants. The size of the slipstream to reducing unit 165 and the amount of reduction performed in it is chosen so as to produce the desired $Fe^{2+}/Fe^{3+}$ ratio in the lean regenerated absorbent 111 which is recycled to the absorption column.

Alternately a portion of the rich solvent stream 112 may be recycled to the top of the absorber column 105 by pumping it to join stream 111 or stream 157 or at an alternate entry point. As is known in the art, recycle of solvent in the manner described is sometimes used to increase the loading in the rich solvent.

Figure 2:
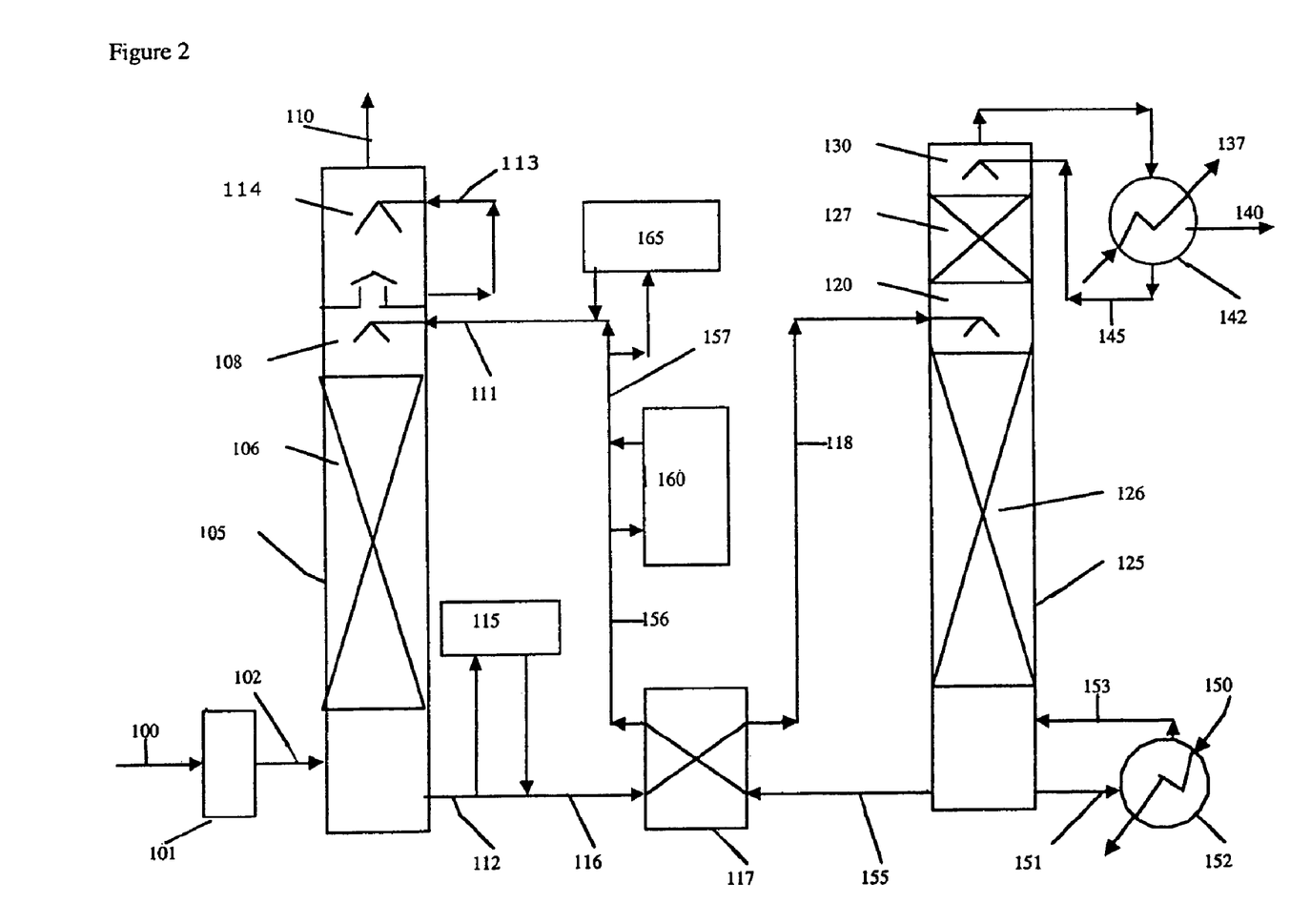
FIG. 2 is an alternate schematic drawing of an apparatus according to this invention; and, FIG. 3 is an alternate schematic drawing of an apparatus according to this invention.

Another embodiment is shown in FIG. 2. According to this alternate embodiment, the feed gas is subjected to a second scrubbing step downstream of the $NO_x$ scrubbing step, which occurs as the treated feed gas stream 102 flows upwardly over packing 106. The second scrubbing step recirculates an oxidizing medium comprising water and an oxidizing agent such as aqueous solutions of potassium permanganate and/or sodium hypochlorite as stream 113 to a gas-liquid contactor through a liquid distributor or spray nozzle 114. The oxidizing agent oxidizes the mercury and the oxidized mercury is absorbed in the oxidizing agent. As the oxidizing agent in stream 113 is consumed, blowdown is taken from the stream 113 and fed to optional treatment for mercury removal (e.g., ion exchange or precipitation with a chemical additive, e.g. TMT™15) and then to disposal. Makeup oxidizing agent is added to the circulating fluid 113.

Figure 3:
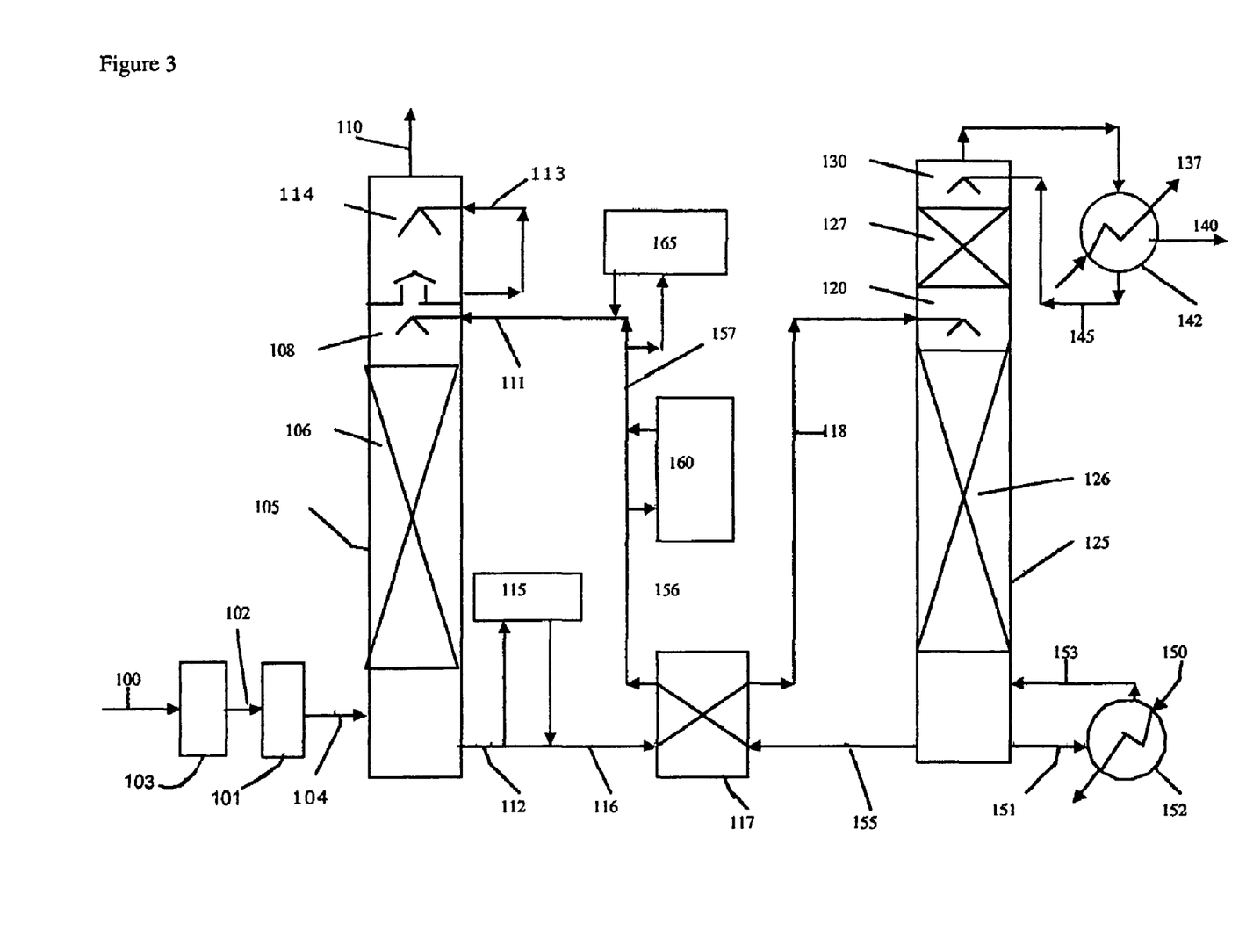

A third embodiment of the invention is illustrated in FIG. 3. This embodiment differs from FIGS. 1 and 2 only in providing for mercury vapor as well as ionic mercury particulates removal in the water spray prescrubber 103 prior to $SO_2$ removal in the unit 101. Mercury removal in prescrubber 103 is preferably accomplished by the feeding of an oxidizing agent (preferably an iron salt containing ferric ions, e.g. ferric sulfate) to the water circulation in the prescrubber. The prescrubber provides for gas-liquid contact by any conventional means known in the art, such as spray nozzles. The mercury vapor is believed to be oxidized by the ferric ions to mercuric ions which are water soluble. The ferric ions are reduced in the process to ferrous ions. Oxygen, which is normally present in the feed gas, re-oxidizes ferrous iron to ferric iron. The iron lost with the prescrubber loop water blowdown needs to be replaced by feeding in additional ferric salt to keep the concentration at the preferred level of 0.1-0.5% wt.

The gas stream 102 which is reduced in mercury is then treated in an $SO_2$ removal process 101, if required, for lowering the $SO_2$ concentration to approximately <100 ppmv. $NO_x$ and further mercury vapor removal will then be performed in column 105 as described previously.

It will be appreciated by those skilled in the art that various modifications may be made to the process described herein and all such modifications are within the scope of the claims. In particular, the manner of operation of the columns and manner in which the absorbent stream 155 is treated may be varied without departing from the invention.

EXAMPLES

Experimental Apparatus

The laboratory pilot unit consisted of a feed gas supply from gas cylinders of air, nitrogen and NO regulated by mass flow controllers to provide the desired composition. The feed gas flowed into a 3-neck flask with a 1 inch diameter glass absorber column mounted in the central neck. The flask contained a magnetic stirring bar and it was immersed in an oil bath on a stirring hotplate. The absorber column contained 0.16" 316 SS Porapak™ saddle packing, either 6 or 12 inches in depth. The top of the column had a scrubbed gas outlet and a lean solvent inlet. Rich solvent from the 3-neck flask was pumped to the top of the regeneration column with a variable speed pump. The regeneration column had a rich absorbent inlet near the top and a reflux condenser with an offgas outlet above that. The column contained 6 inches of 0.16" 316 SS Porapak™ saddle packing and also had 5 glass sieve trays. A 3-neck flask immersed in an oil bath sitting on a stirring hotplate served as the liquid sump. The flask contained a magnetic stirring bar. The regenerated absorbent (lean solvent) was pumped from the flask to the absorber column through a cooler by a variable rate pump. The volume of absorbent in the apparatus was 600 ml.

Analysis of the feed and treated gas (i.e., NO, $NO_x$ ($NO+NO_2$), $SO_2$ and $O_2$) was made with a Testo™ 350 analyzer. $Fe^{2+}$ and total iron were measured by the phenanthroline method, using a Genesys™ 10 UV spectrometer to measure absorbance. The feed gas contained 5 vol. % $O_2$ in all experiments. The absorbent was prepared by adding tetrasodium EDTA to water, adding ferrous sulfate heptahydrate at 1:1 mole ratio to the EDTA, adding other additives if used and adjusting the pH to the desired value with either sulfuric acid or sodium hydroxide. Water was added to bring the final volume to 600 ml.

For experiments testing mercury removal, an ASP™ Model 10.534 mercury vapor generator was used. Elemental mercury in the feed and treated gases was measured by a Jerome™ 431-X gold foil analyzer. Some mercury removal experiments were performed by sparging the feed gas through a fritted glass sparger through a 5 cm. depth of the test liquid.

Example 1

The $DeNO_x$ ($NO_x$ removal) performance and the rate of $Fe^{2+}$ oxidation in an uninhibited 0.1 M solution of $Fe^{2+}$ EDTA was measured. The absorber has 12" of packing, the absorber and regenerator sump oil baths were kept at 60° C. and 115° C. respectively. The absorbent flow rate was 10 ml/min and the gas flow was 2.3 l/min with a composition of 5% $O_2$ and 580 ppmv NO, 13 ppmv $NO_2$ with the balance nitrogen. The treated gas contained undetectable $NO_2$. The ferrous iron oxidized to $Fe^{3+}$ in about 4 hours, with the % $DeNO_x$ decreasing accordingly. Addition of sodium dithionite ($Na_2S_2O_4$) reducing agent increased the concentration of $Fe^{2+}$ and % $DeNO_x$. The absorbent pH dropped quickly from 5.7 to the 3-4 range. The results are given in the following table. The following is the definition of the heading of each column in the table.

$Na_2S_2O_4$,(g): The amount in grams of $Na_2S_2O_4$ added to the absorbent.

$Fe^{2+}$ %: The percent of iron present in the absorbent in the ferrous state.

NO: The NO content in ppmv in the treated gas. The time=0 value is the NO concentration in the feed gas.

Lean pH: The pH of the regenerated absorbent prior to its introduction to the absorber.

% $DeNO_x$: (NO in the feed gas−NO in the treated gas)/NO in the feed gas

| Time, hours | $Na_2S_2O_4$, g | $Fe^{2+}$, % | NO | Lean pH | % $DeNO_x$ |
|---|---|---|---|---|---|
| 0 | | 100 | 580 | 5.7 | — |
| 0.5 | | 76 | 48 | 3.91 | 92 |
| 1 | | 51 | 48 | 3.67 | 92 |
| 2 | | 51 | 95 | 3.49 | 84 |
| 3 | | 38 | 138 | 3.6 | 76 |
| 4 | | 13 | 145 | 3.65 | 75 |
| 5 | 2 | <13 | 53 | 3.15 | 91 |
| 6 | 1 | 68 | 82 | 3.41 | 86 |
| 7 | 2 | 25 | 109 | 3.75 | 81 |
| 8 | 2 | 25 | 149 | 3.85 | 74 |
| 9 | 1 | 25 | 113 | 3.62 | 81 |
| 10 | | 25 | 123 | 3.75 | 79 |

In four hours, most of the iron had been oxidized to ferric iron thus deactivating much of the absorbent. The addition of the dithionite was required to reactivate the absorbent. The rapid deactivation of the absorbent clearly makes the use of aqueous FeEDTA alone an unsatisfactory absorbent for NO.

Example 2

The experiment of Example 1 was repeated with 1.68 wt. % sulfite ion from sodium sulfite and 0.42 wt. % thiosulfate ion from sodium thiosulfate added to the absorbent. The NO and $NO_2$ concentrations in the feed gas were 540 and 44 ppmv respectively. The feed gas flow rate was 2.3 l/min and contained 5 vol. % $O_2$ and the absorbent rate was 10 ml/min. The treated gas contained undetectable $NO_2$. The results are given in the table below.

| Time, hours | $Na_2S_2O_5$, g | $Fe^{2+}$, % | NO | Lean pH | % $DeNO_x$ |
|---|---|---|---|---|---|
| 0 | | 100 | 540 | 5.9 | — |
| 0.5 | | 64 | 25 | 5.89 | 95% |
| 1 | | 64 | 22 | 5.97 | 96% |
| 2 | | N/A | 27 | 5.63* | 95% |
| 3 | | 51 | 30 | 5.66 | 94% |
| 4 | | 64 | 37 | 5.67 | 93% |
| 5 | 3 | 64 | 42 | 5.57 | 92% |
| 6 | | 51 | 37 | 5.81 | 93% |
| 6.5 | 4 | 51 | 40 | 5.88 | 93% |
| 7 | | 51 | 43 | 5.64* | 92% |
| 7.5 | 5 | 51 | 40 | 5.76 | 93% |
| 8 | | 64 | 33 | 5.76 | 94% |
| 9 | | 64 | 30 | 5.83 | 94% |

-continued

| Time, hours | Na₂S₂O₅, g | Fe²⁺, % | NO | Lean pH | % DeNOₓ |
|---|---|---|---|---|---|
| 10 | | 51 | 33 | 5.89* | 94% |
| 10.33 | | 51 | 35 | 5.94 | 94% |

Note:
*Sulfuric acid added to maintain pH close to 5.9.

The addition of the sulfite and thiosulfate resulted in a higher and more stable % DeNO$_x$. Sulfite was consumed by the oxidation process with the sulfite ion level decreasing to 0.68 wt. % in 4.5 hours. To maintain the presence of sulfite in the absorbent, sodium pyrosulfite ($Na_2S_2O_5$) was added as indicated. The thiosulfate ion was consumed much slower, decreasing to 0.35 and 0.34 wt. % at 4.5 and 10.33 hours respectively. The absorbent tended toward the more alkaline end of the preferred pH range, so dilute sulfuric acid was added as required to maintain the pH close to 5.9.

Example 3

The test in Example 2 was continued with the same absorbent (i.e. the absorbent from the end of the run of Example 2), using sodium dithionite as a reducing agent reagent to maintain the Fe$^{2+}$ concentration high enough to provide efficient DeNO$_x$ performance. The test data are given in the table below.

| Time, hours | Na₂S₂O₄, g | Fe²⁺, % | NO | % DeNOx |
|---|---|---|---|---|
| 0 | | 44 | 566 | |
| 1 | 1 | 38 | 74 | 87% |
| 1.5 | 1 | 51 | 55 | 90% |
| 2.5 | 1 | 51 | 40 | 93% |
| 3 | | 51 | 31 | 95% |
| 4 | 1 | 51 | 39 | 93% |
| 5.5 | 1 | 51 | 41 | 93% |
| 6 | | 51 | 34 | 94% |
| 7 | 1 | 51 | 49 | 91% |
| 8 | 1 | 38 | 52 | 91% |
| 9.5 | 1 | 51 | 42 | 93% |
| 10.5 | 1 | 51 | 41 | 93% |
| 11 | | 38 | 46 | 92% |
| 11.5 | 1 | 51 | 44 | 92% |

The consumption rate of dithionite reducing agent was 0.87 g/hr. The sulfite ion concentration dropped from 0.74 wt. % at time zero to 0.57 wt. % at 11.5 hours, while the thiosulfate concentration stayed constant at 0.34 wt. %, indicating that the dithionite was the major reagent being consumed. Sulfate ion increased from 1.66 to 1.92 wt. % over the 11.5 hour run. The absorbent pH remained essentially unchanged at pH 5.5.

Example 4

The consumption rate of dithionite was measured similarly to Example 3 (0.1 M FeEDTA, 2 wt. % sodium sulfite, 0.5 wt. % sodium thiosulfate), but adding 4-(2-hydroxyethyl)-1-piperazineethanesulfonic acid, sodium salt (HEPES) at a 1:1 HEPES:Fe mole ratio to the absorbent. The test results are given below.

| Time, hours | Na₂S₂O₄, g | Fe²⁺, % | NO | % DeNOₓ |
|---|---|---|---|---|
| 0 | | 100 | 596 | |
| 1 | | 51 | 1 | 100% |
| 2 | | 38 | 10 | 98% |
| 3 | | 25 | 25 | 96% |
| 4 | | 25 | 29 | 95% |
| 5 | 1 | 38 | 33 | 94% |
| 6 | | 25 | 29 | 95% |
| 7 | | 25 | 43 | 93% |
| 7.5 | 1 | 25 | 51 | 91% |

The dithionite consumption rate with HEPES present was 0.27 g/hr., significantly lower than the 0.87 g/hr. without it.

Example 5

Example 4 was repeated using N-(2-hydroxyethyl)piperazine (HEP) instead of HEPES. The results were essentially equivalent at both 1:1 and 2:1 HEP:Fe mole ratios. The % DeNO$_x$ was 91-94% and the sodium dithionite consumption rate was 0.59 g/hr.

Example 6

Hydrazine (as the monohydrate) was tested as a reducing agent to more clearly elucidate the rate of Fe$^{3+}$ reduction than dithionite, since the reaction products from hydrazine are not reducing agents, unlike dithionite which yields sulfite which reacts further. Also, hydrazine only reduces Fe$^{3+}$ and does not react with nitrosyl groups. The absorbent was 0.1 M FeEDTA with an 1:1 HEPES:Fe ratio and containing no sodium sulfite or sodium thiosulfate. Each hydrazine reduces 4 ferric ions:

$$4\ Fe^{3+}+N_2H_4 \Rightarrow 4Fe^{2+}+N_2+4H^+$$

The test was run 6.5 hours. Hydrazine monohydrate was added to the solvent to keep the NO removal >93%. The initial absorbent pH was 5.3 dropping to 5.0+/−0.1 during the rest of the experiment. The average hydrazine hydrate consumption rate during the test was 0.39 g/hr. The hydrazine was effective in maintaining the Fe$^{2+}$ in the preferred range despite oxidation of the iron during the run.

Example 7

The experiment of Example 6 was continued after the addition of 20 g of sodium pyrosulfite ($Na_2S_2O_5$) and 5 grams of sodium thiosulfate to the 600 ml of absorbent. The test was continued for 12.28 hours and had a hydrazine hydrate consumption rate of 0.05 g/hr. The NO removal was between 96 and 98%. The addition of the sodium pyrosulfite and the sodium thiosulfate reduced the consumption rate of the hydrazine and therefore reduced the oxidation rate of the ferric iron.

Example 8

NO removal with 0.1 M ferrous N-(2-hydroxyethyl) ethylenediaminetriacetate sodium (HEDTA) salt as the chelating agent was tested. The absorbent contained HEP at 1:1 mole ratio to the iron and 20 g of sodium pyrosulfite and 5 g of sodium thiosulfate. The NO removal was 93-97% over the 4 hour run and hydrazine consumption was 0.07 g/hr. Once again, the addition of the sodium pyrosulfite and the sodium thiosulfate reduced the consumption rate of the hydrazine and therefore reduced the oxidation rate of the ferric iron. This example also demonstrates that the iron HEDTA complex is an effective NO absorbent.

Example 9

The test of Example 8 was repeated, but at a 2:1 HEP:Fe ratio. The NO removal was 93-94% and the hydrazine consumption was 0.2 g/hr. Once again, the addition of the sodium pyrosulfite and the sodium thiosulfate reduced the consumption rate of the hydrazine and therefore reduced the oxidation rate of the ferric iron.

Example 10

An attempt to repeat the test of Example 8 was made at a 3:1 Hep:Fe ratio. The Fe:HEDTA complex was unstable and precipitated iron oxide.

Example 11

An NO removal test was performed at pH 5.5 with 0.3 M $Fe^{2+}$ EDTA. The 600 ml of absorbent also contained 39 g of HEP (0.3 M), 20 g of sodium pyrosulfite and 5 g of sodium thiosulfate. The gas flow rate was 2.1 l/min and the liquid rate was 10 ml/min. The feed gas contained 5 vol. % $O_2$ and 713 ppmv NO. NO removal was >99%.

Example 12

The test of Example 11 was repeated with a feed gas flow of 4.2 l/min and absorber packing height of 6". NO removal was 89%. This showed that a higher gas velocity and a less efficient column decreased $NO_x$ removal.

Example 13

NO removal was tested with an absorbent (600 ml) containing 0.1 M FeEDTA, 0.1 M DIHEP (N,N'-di(2-hydroxyethyl)piperazine), 20 g of sodium pyrosulfite and 5 g of sodium thiosulfate. NO removal was 93-96% and the hydrazine consumption was 0.17 g/hr.

Example 14

A sparger apparatus was used at ambient temperature to test mercury removal with 2% wt. potassium permanganate solution in water. The solution pH was close to neutral. The feed gas contained 69 μg/m³ of mercury and the exit gas from the sparger contained no detectable mercury vapor. Accordingly, potassium permanganate was effective in oxidizing the mercury so that the mercury could be absorbed in water.

Example 15

The flow apparatus and the same absorbent as in Example 14 was used to measure NO removal. The feed gas contained 123 ppmv NO and 9 ppmv $NO_2$. The exit gas contained 4 ppmv NO and 39 ppmv $NO_2$ indicating that the $NO_2$ produced by oxidation was volatile under the experimental conditions.

Example 16

The capture of mercury vapor by 0.1 M $Fe^{3+}$ sulfate was tested with the sparger apparatus. The feed gas contained 73 μg/m³ mercury vapor, 4% vol. $O_2$ and the balance nitrogen.

The treated gas contained 55 μg/m³ mercury, indicating 25% mercury vapor removal.

Example 17

The capture of mercury vapor by 0.1% wt. solution of potassium permanganate in water was tested using the sparging apparatus. The feed gas was nitrogen containing 81 μg/m³ mercury vapor. The treated gas contained no detectable mercury vapor, indicating close to 100% removal.

Example 18

The effectiveness of 4-amino-5-hydroxy-2,7-naphthalenedisulfonic acid monosodium salt (HANDS) in reducing $Fe^{2+}$ oxidation and EDTA degradation was tested. Removal of NO from a gas stream was tested in the laboratory pilot unit described under Experimental Apparatus. Reduction of ferric ions to ferrous was effected by an electrolysis cell (MicroFlow cell purchased from ElectroCell North America, 0.006 m² Nafion membrane area). The $NO_x$ absorbent was the catholyte and dilute sulfuric acid was the anolyte. Gas analysis was performed with a Horiba PG-250 analyzer.

| Test conditions | |
| --- | --- |
| Gas flow | 2.1 liter/min |
| Absorbent flow | 5.0 ml/min |
| Gas Composition | NO 500 ppm |
| | $O_2$ 5% |
| | $N_2$ balance |

| Test Number | 1 | 2 | 3 |
| --- | --- | --- | --- |
| [Fe] | 0.1 M | 0.1 M | 0.1 M |
| [$EDTA^{4-}Na_4$] | 0.12 M | 0.14 M | 0.12 M |
| [HANDS] | 0 | 0.1 M | 0.2 M |
| % DeNOx @ 14 hrs. | 83 | 95 | 94 |
| EDTA Degraded[1] | 17% | 7% | 3% |
| % $Fe^{2+}$ Note 2 | 26 | 65 | 100 |

Note 1.
Percent of initial EDTA degraded in 14 hours.
Note 2.
Steady state concentration of ferrous iron as percentage of total iron, at a reduction cell current of 0.04 amps. Low % $Fe^{2+}$ is the result of a higher rate constant for the oxidation reaction which is assumed to obey first order kinetics in [$Fe^{2+}$].

It can be seen from the results in the Table that 4-amino-5-hydroxy-2,7-naphthalenedisulfonic acid is effective in reducing both the rate of EDTA degradation and iron oxidation.

The invention claimed is:

1. A cyclic process for the removal of $NO_x$ from a $NO_x$ containing feed gas stream using an absorbent and for the regeneration of the absorbent, which comprises:
   (a) contacting the feed gas stream with the absorbent to form a $NO_x$ rich absorbent, the absorbent comprising an iron amine polycarboxylic acid chelate, and an additive having free radical scavenger functionality and amine functionality;
   (b) treating the $NO_x$ rich absorbent to remove $NO_x$ and to form a regenerated absorbent; and, (c) recycling the regenerated absorbent to the contacting step.

2. The process of claim 1 wherein the additive comprises a free radical scavenger and an amine having a pKa in the range 2.5-10.

3. The process of claim 2 further comprising providing an amine with a pKa in the range 3.9-9.5.

4. The process of claim 2 further comprising providing an oxygen scavenger with the absorbent.

5. The process of claim 4 further comprising selecting at least one sulfite or bisulfite as the oxygen scavenger.

6. The process of claim 5 wherein the absorbent comprises 0.01-5 weight percent sulfite or bisulfite.

7. The process of claim 2 further comprising selecting at least one thiosulfate as the free radical scavenger.

8. The process of claim 7 wherein the absorbent comprises 0.01-1 weight percent thiosulfate.

9. The process of claim 1 wherein the additive comprises benzene and/or naphthalene derivatives wherein one of the functional groups at the 1,2-position of the benzene and the 1,8-positions of the naphthalene comprises an amine.

10. The process of claim 9 wherein another of the functional groups at the 1,2-position of the benzene and the 1,8-positions of the naphthalene comprises an amine, a phenol or a phenoxide, if the solution pH is alkaline enough to cause ionization of the phenol.

11. The process of claim 9 wherein the benzene and/or naphthalene derivatives have a solubilizing group on the aromatic ring structure.

12. The process of claim 11 wherein the solubilizing group comprises sulfonic acid, a nitro substituent, carboxylic acid or a hydroxyethyl substituent.

13. The process of claim 10 wherein the benzene and/or naphthalene derivatives have a solubilizing group on the aromatic ring structure.

14. The process of claim 13 wherein the solubilizing group comprises sulfonic acid, a nitro substituent, carboxylic acid or a hydroxyethyl substituent.

15. The process of claim 9 wherein the additive is used at a ratio of 0.05-3.0 moles per atom of iron.

16. The process of claim 1 wherein step (b) comprises exposing the $NO_x$ rich absorbent to steam.

17. The process of claim 1 wherein step (b) comprises exposing the $NO_x$ rich absorbent to steam to form a lean absorbent and treating at least a portion of the lean absorbent to remove anions therefrom to form the regenerated absorbent prior to recycling the regenerated absorbent to the contacting step.

18. The process of claim 17 wherein the anions are removed by at least one of ion exchange, electrodialysis and precipitation.

19. The process of claim 1 wherein step (b) comprises exposing the $NO_x$ rich absorbent to steam to form a lean absorbent and treating at least a portion of the lean absorbent to reduce iron in the iron chelate from $Fe^{3+}$ to $Fe^{2+}$.

20. The process of claim 19 wherein iron is reduced by electrolysis.

21. The process of claim 19 wherein iron is reduced by treating the iron chelate with at east one of hydrazine hydrate, sodium dithionite and calcium dithionite.

22. The process of claim 19 wherein iron is reduced by electrolysis, wherein an anion selective membrane separates the cathode and anode compartments.

23. The process of claim 1 wherein the pH of the regenerated absorbent is in the range 4-7.

24. The process of claim 1 wherein the pH of the absorbent is essentially maintained in the range 4-7 during the contacting step.

25. The process of claim 1 wherein the feed gas stream contains up to 100 ppmv $SO_2$.

26. The process of claim 1 wherein the absorbent is iron ethylenediaminetetraacetate disodium salt.

27. The process of claim 26 wherein the absorbent comprises a 0.05-0.5M iron chelate solution.

28. The process of claim 1 wherein the amine has a vapor pressure over the lean regenerated absorbent <1 mm Hg at 50° C.

29. The process of claim 1 wherein the amine is selected from the group consisting of 4-(2-hydroxyethy)-1-piperazineethanesulfonic acid, morpholinoethanesulfonic acid, N-(2-hydroxyethyl)ethylenediamine, piperazine, N-(2-hydroxyethyl)piperazine, pyrazole and mixtures thereof.

30. The process of claim 2 wherein the amine is selected from the group consisting of 4-(2-hydroxyethyl)-1-piperazineethanesulfonic acid, N-(2-hydroxyethyl)ethylenediamine, piperazine and mixtures thereof.

31. The process of claim 2 wherein the amine comprises pyrazole.

32. The process of claim 2 wherein the mole ratio of amine to iron is from 1:1 to 3:1.

33. The process of claim 9 wherein the additive is 4-amino-5-hydroxy-2,7-naphthalenedisulfonic acid and/or sulfonated 1, 8-diaminonaphthalene.

34. The process of claim 1 wherein 20 to 90% of the total iron is in the $Fe^{2+}$ state.

35. The process of claim 1 wherein the feed gas stream also includes elemental mercury vapour which is oxidized by the absorbent to form ionic mercury and the process further comprises treating at least a portion of the $NO_x$ rich absorbent to remove mercury therefrom.

36. The process of claim 35 wherein the ionic mercury is removed from the $NO_x$ rich absorbent by at least one of ion exchange and precipitation.

* * * * *